United States Patent [19]

Binding et al.

[11] 3,984,038
[45] Oct. 5, 1976

[54] CAR TOP CARRIER AND SUPPORTS THEREFOR

[75] Inventors: Kenneth W. Binding, Woburn; Hyman Silbovitz, Peabody, both of Mass.

[73] Assignee: Beatrice Foods Co., Chicago, Ill.

[22] Filed: Mar. 17, 1975

[21] Appl. No.: 559,080

Related U.S. Application Data

[63] Continuation of Ser. No. 395,947, Sept. 10, 1973, abandoned.

[52] U.S. Cl. ..................... 224/42.1 F; 224/42.1 G
[51] Int. Cl.² ............................................ B60R 9/04
[58] Field of Search .................. 224/42.1 F, 42.1 E, 224/42.1 G, 42.1 R, 42.1 H, 29 R, 42.45 R; 248/226 R, 226 E, 226 B, 226 C, 226 A, 316 R, 316 E, 316 C

[56] References Cited
UNITED STATES PATENTS

| | | | |
|---|---|---|---|
| 3,132,780 | 5/1964 | Binding | 224/42.1 F |
| 3,281,030 | 10/1966 | Gosswiller | 224/42.1 F |
| 3,858,774 | 1/1975 | Friis | 224/42.1 F |

FOREIGN PATENTS OR APPLICATIONS

| | | | |
|---|---|---|---|
| 90,595 | 3/1961 | Denmark | 224/42.1 F |
| 1,366,601 | 6/1964 | France | 224/42.1 G |
| 1,155,509 | 6/1969 | United Kingdom | 224/42.1 E |

*Primary Examiner*—Robert J. Spar
*Assistant Examiner*—Jerold M. Forsberg
*Attorney, Agent, or Firm*—Robert T. Gammons

[57] ABSTRACT

Bracket supports for attaching the opposite ends of a vehicle top carrier bar to the top of a vehicle of the kind having a relatively high curvature between its sides, each bracket comprising a truncated structure having a horizontal bridge piece and at its ends downwardly extending, divergent legs, at the lower ends of which there are vertical extensions containing vertically spaced holes, clamp plates mounted on the bridge pieces for clamping engagement with the ends of the carrier bar, and rigid posts of U-shaped cross-section telescopically engaged with the vertical extensions of the brackets, said posts containing holes corresponding in spacing to the holes in the extensions for receiving bolts to enable adjusting the extensions heightwise on the posts, feet at the lower ends of the posts for engagement with the upper sides of the gutters at opposite sides of the top, and jaws mounted to the feet for clamping engagement with the lower sides of the gutters.

5 Claims, 4 Drawing Figures

CAR TOP CARRIER AND SUPPORTS THEREFOR

This is a continuation of application Ser. No. 395,947 filed on Sept. 10, 1973 now abandoned.

BACKGROUND OF THE INVENTION

Car top carriers and means for attaching them to the top of a car including supporting legs fastened to the ends of the bar for supporting the bar in spaced relation to the top are old in the art; however, in so far as known no supports are provided which enable mounting a carrier bar to the top of a vehicle having a very high arched roof portion and, in particular, vehicle tops provided with a blister such as is common to campers. The lack of such adequate supporting means makes it impossible to use conventional carriers in conjunction with such vehicles. It is the purpose of this invention to provide especially designed carrier brackets to enable mounting carrier bars to the tops of vehicles of the kind referred to and especially to provide brackets for this purpose which are of very simple construction and designed when attached to the vehicle to prevent forward and rearward tipping of the load carried thereby due to fast acceleration and deceleration of the vehicle; to provide a bracket structure which is adjustable heightwise for accommodating itself to tops of different height; and to provide a bracket structure which can be securely clamped to the gutters at the sides of the top.

SUMMARY

The bracket supports according to this invention are for attaching the opposite ends of a vehicle top carrier bar to the top of a vehicle of a kind having a relatively high curvature such as a dome or blister between its sides and and each bracket comprises a rigid truncated structure having a horizontal bridge piece and at its ends downwardly extending divergent legs, at the lower ends of which there are vertical extensions containing vertically spaced holes, means on the bridge pieces for securing the brackets to the carrier bar, and means telescopically engaged with the vertical extensions for clamping the brackets to the gutters at the opposite sides of the top, each of said latter means comprising rigid posts of U-shaped cross-section within which the vertical extensions of the brackets are telescopically engaged containing holes corresponding in spacing to those in the extensions for receiving bolts to enable adjusting the extensions heightwise in the posts, feet at the lower ends of the posts for engagement with the upper sides of the gutters and jaws mounted to the feet for clamping engagement with the lower sides of the gutters. The brackets are secured to the carrier bar with their legs disposed at right angles to the center line so that they extend forwardly and rearwardly of the center line. The carrier bar is of tubular cross-section and contains a slot longitudinally of its underside. The means for securing the brackets to the carrier bar comprise clamp plates of U-shaped cross-section disposed within the carrier bar for movement therealong to enable adjusting the brackets lengthwise of the bar, bolts extending therefrom through the slot and the bridge pieces and nuts threaded onto the lower ends of the bolts against the underside of the bridge pieces. Each truncated structure is comprised of seamless tubular stock of substantially rectangular cross-section and the structure is stiffened at the junctions of the legs at their upper ends with the bridge piece and at their lower ends with the extensions by outwardly disposed portions of the inner walls of the tubular stock and by inwardly disposed portions of the outer wall but to a lesser degree.

The invention will now be described in greater detail with reference to the accompanying drawings wherein.

Figure 1:
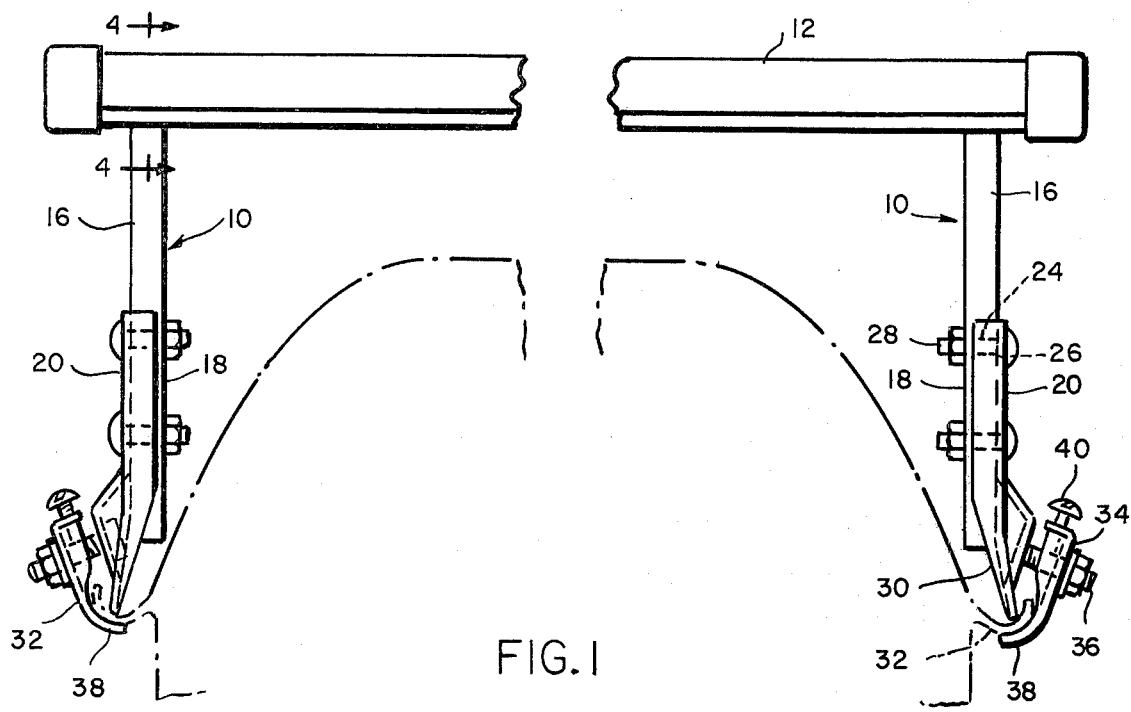
FIG. 1 is an elevation broken away in part of the bracket supports supporting a carrier bar on the top of a vehicle of the kind having a blister or high dome intermediate the opposite sides and gutters at its opposite sides.

Referring to the drawings, the bracket members of this invention, represented by the reference characters 10—10, are shown supporting the opposite ends of a carrier bar 12 across the top of a vehicle of the kind which has a very high arcuate curvature, for example a dome or blister such as provided on campers, which is of such a height that the known car top carriers cannot be mounted thereon.

Figure 2:
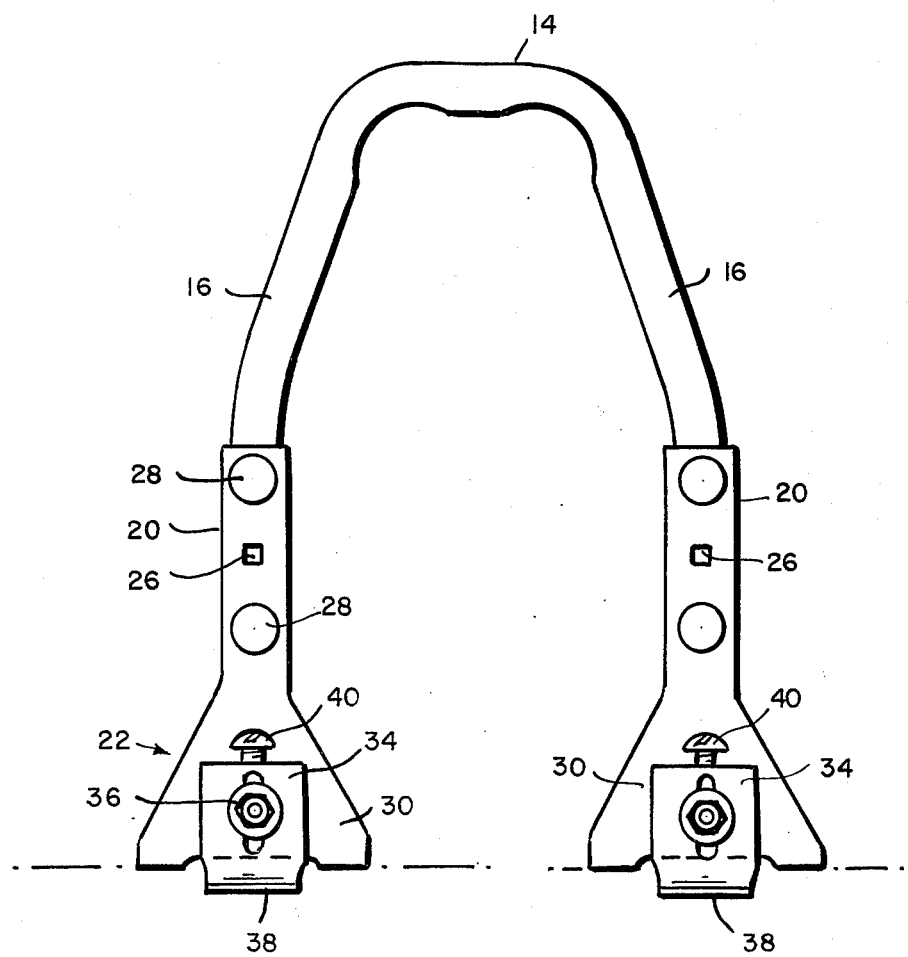
FIG. 2 is an elevation of one of the brackets as seen from the outer side.
Figure 3:
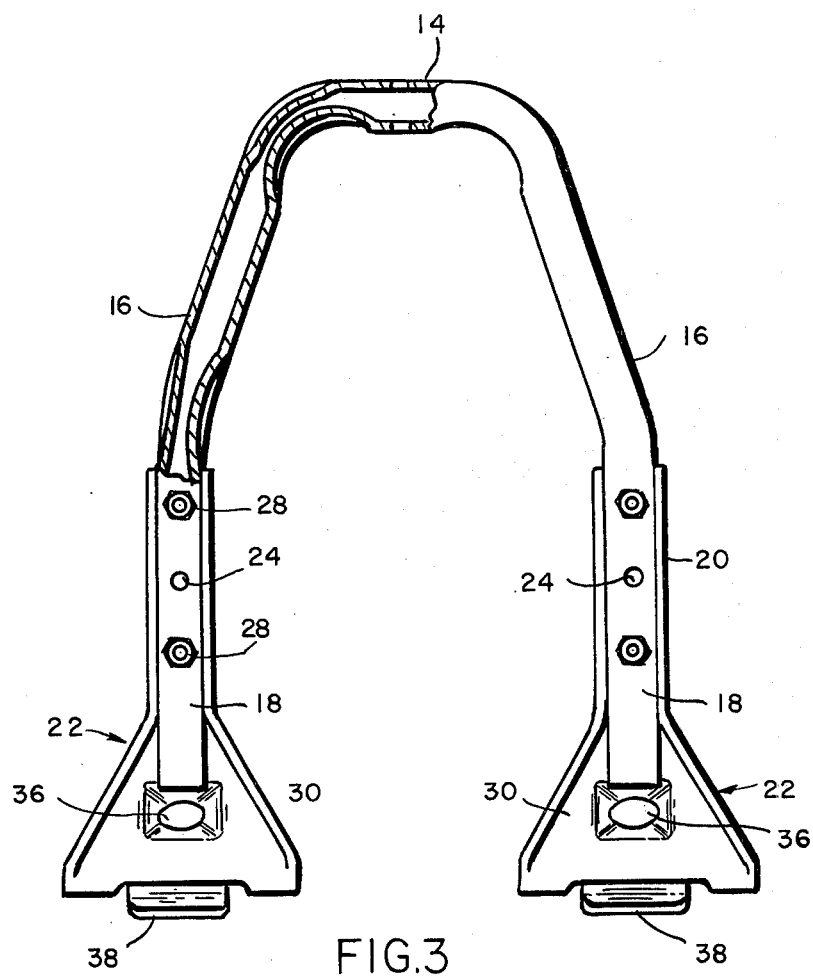
FIG. 3 is a corresponding view of the bracket as seen from the inner side with portions in section.

Each bracket 10, as shown in FIGS. 2 and 3, comprises a truncated structure having a horizontal bridge piece 14, diverging legs 16—16 and vertical, spaced parallel extensions 18—18, and supporting posts 20—20 provided with clamping means 22—22 at their lower ends for clamping the brackets to the gutters at opposite sides of the top.

The truncated structure is comprised of tubular stock of substantially rectangular cross-section and is bent at the junctions of the upper ends of the legs with the bridge piece and at the lower ends of the legs with the extensions along arcs of relatively long radius and is stiffened in these areas, as shown in FIG. 3, by displacing the inner sides of the tubular structure at the junctions outwardly and the outer sides inwardly but to a lesser degree.

The vertical extensions 18—18 of each bracket structure have vertically spaced openings 24 and are telescopically engaged within the posts 20—20 which are of U-shaped cross-section and which have vertically spaced openings 26 corresponding in number and spacing to the openings 24 for receiving bolts 28 by means of which the extensions 18—18 may be adjusted heighwise in the posts 20—20. The posts 20—20 have at their lower ends feet 30—30, the lower edges of which are adapted to be engaged within the inner sides of the gutters 32—32 at the opposite sides of the car top. Clamp plates 34—34 are mounted on the feet by means of bolts 36—36 which have hooks 38—38 for engagement with the undersides of the gutters. Screws 40—40 provide for adjusting the clamp plates relative to the feet to bring the hooks 38—38 into engagement with the undersides of th gutters and the screws 40—40 provide for clamping the feet and hooks in engagement with the gutters.

Figure 4:
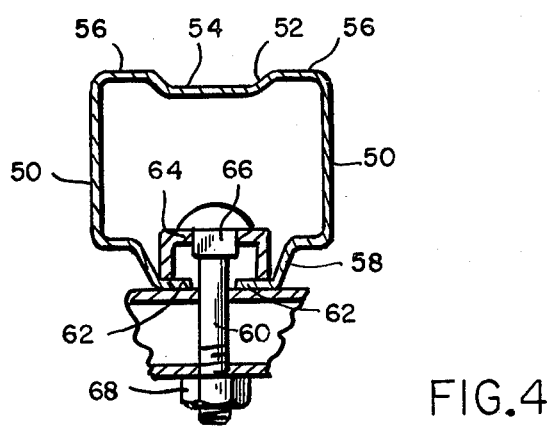
FIG. 4 is a vertical section taken on the line 4—4 of FIG. 1.

The carrier bar 12, as shown in FIG. 4, is tubular comprising spaced parallel side walls 50—50, a top wall 52 containing a depressed portion 54 along the opposite sides of which are raised shoulders 56—56 and a bottom portion 58 of reduced cross-section containing an open slot 60 lengthwise thereof providing at the lower side of the carrier bar spaced parallel, horizontally disposed flanges 62—62.

The brackets are mounted to the carrier bar for adjustment lengthwise thereof by means of two clamp plates 64—64 (FIG. 4) of U-shaped cross-section slidingly mounted within the carrier bar with their open sides facing downwardly and resting on the flanges 62—62 by bolts 66 which extend from the clamp plates through the slot 60 and through the bridge pieces 14—14 at the tops of the brackets. Nuts 68 threaded onto the lower ends of the bolts provide for pinching the flanges 62—62 between the clamp plates in their selected positions of adjustment lengthwise of the carrier bar.

The brackets as thus constructed provide extremely stiff, rigid and stable supports for the ends of the carrier bar even though the latter is situated at a considerable height above the gutters because of the relatively wide spread between the legs and the clamping means by means of which they are attached to the gutters at the sides of the top which resist forward or rearward tipping of the carrier bar.

It should be understood that the present disclosure is for the purpose of illustration only and that this invention includes all modifications and equivalents falling within the scope of the appended claims.

We claim:

1. A car top carrier comprising a rigid carrier bar, a bracket at each end of the bar, comprising a rigid one-piece tubular structure of rectangular cross section having a horizontal portion, sharply bent divergent portions and parallel portions, said sharply bent divergent portions being bent downwardly from the ends of the horizontal portion and said parallel portions being bent inwardly from the lower ends of the divergent portions so as to be perpendicular to the horizontal portion, the walls of the tubular structure at the bends being depressed inwardly along the convex sides of the arcs of the bends and outwardly along the concave sides of the arcs of the bends, said depressions providing reinforcing ribs at the bends and means embodied in the horizontal portion for receiving fastening means for clamping engagement with the carrier bar with the horizontal portion at right angles to the longitudinal center line of the carrier bar so that the divergent portions and the parallel portions extend forwardly and rearwardly of the longitudinal axis of the bar, fastening means interengageable with said last means for clamping the brackets to the carrier bar, rigid posts telescopically mounted on the lower ends of the parallel portions, means for adjusting the parallel portions on the posts heightwise thereof and clamping means at the lower ends of the posts for clamping engagement with the gutters at opposite sides of the car top.

2. A car top carrier according to claim 1, wherein the rigid carrier bar is tubular and substantially rectangular in cross section and contains an opening at its lower side for receiving the fastening means by means of which it is fastened to the brackets.

3. A car top carrier according to claim 2, wherein parts of U-shaped cross sections are mounted within the tubular carrier bar astride the opening at the lower side thereof containing openings for receiving the fastening means by means of which the carrier bar is fastened to the brackets, said fastening means passing through said openings, through the opening at the lower side of the carrier bar and through the means embodied in the horizontal portions of the bracket members.

4. A car top carrier according to claim 2, wherein said parts for clamping of the carrier bar to the brackets are adjustable longitudinally of the carrier bar.

5. A car top carrier according to claim 3, wherein there are flanges along the opposite sides of the opening at the lower side of the carrier bar for receiving the lower ends of the U-shaped clamp parts.

* * * * *